US011421708B2

(12) United States Patent
Cousins et al.

(10) Patent No.: US 11,421,708 B2
(45) Date of Patent: Aug. 23, 2022

(54) REFRIGERATION SYSTEM MIXED-FLOW COMPRESSOR

(71) Applicant: Carrier Corporation, Palm Beach Gardens, FL (US)

(72) Inventors: William T. Cousins, Glastonbury, CT (US); Vishnu M. Sishtla, Manlius, NY (US); Michael M. Joly, Hebron, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 179 days.

(21) Appl. No.: 16/243,833

(22) Filed: Jan. 9, 2019

(65) Prior Publication Data

US 2019/0285085 A1 Sep. 19, 2019

Related U.S. Application Data

(60) Provisional application No. 62/644,017, filed on Mar. 16, 2018.

(51) Int. Cl.
*F04D 17/06* (2006.01)
*F04D 29/44* (2006.01)
(Continued)

(52) U.S. Cl.
CPC ....... *F04D 29/444* (2013.01); *F04D 13/0646* (2013.01); *F04D 17/06* (2013.01);
(Continued)

(58) Field of Classification Search
CPC ...... F04D 29/444; F04D 25/082; F04D 17/06; F04D 25/06; F04D 29/284;
(Continued)

(56) References Cited

U.S. PATENT DOCUMENTS 5,228,832 A 7/1993 Nishida et al.
7,856,834 B2 12/2010 Haley
(Continued)

FOREIGN PATENT DOCUMENTS

CN 205514327 U 8/2016
EP 3141757 A 3/2017
(Continued)

OTHER PUBLICATIONS

Extended European Search Report; International Application No. 19163280.1-1007; International Filing Date: Mar. 15, 2019; dated Aug. 9, 2019; 7 pages.
(Continued)

*Primary Examiner* — Eldon T Brockman
(74) *Attorney, Agent, or Firm* — Cantor Colburn LLP

(57) ABSTRACT

An impeller mountable within a centrifugal compressor includes a hub having a front side and a back side, the hub being rotatable about an axis of rotation and a plurality of vanes extending outwardly from the front side of the hub such that a plurality of passages is defined between adjacent vanes. The plurality of vanes is oriented such that a flow output from the plurality of passages adjacent the back side of the impeller is arranged at an angle to the axis of rotation of less than 20 degrees.

12 Claims, 5 Drawing Sheets

(51) Int. Cl.

| | |
|---|---|
| ***F04D 13/06*** | (2006.01) |
| ***F04D 25/08*** | (2006.01) |
| ***F04D 25/06*** | (2006.01) |
| ***F04D 29/28*** | (2006.01) |
| *F25B 31/02* | (2006.01) |

(52) U.S. Cl.
CPC ........... *F04D 25/06* (2013.01); *F04D 25/082* (2013.01); *F04D 29/284* (2013.01); *F05D 2250/52* (2013.01); *F25B 31/026* (2013.01)

(58) Field of Classification Search
CPC .. F04D 13/0646; F04D 17/10; F05D 2250/52; F25B 31/026
See application file for complete search history.

(56) References Cited

U.S. PATENT DOCUMENTS

| | | | | |
|---|---|---|---|---|
| 8,037,713 | B2 | 10/2011 | Haley et al. | |
| 8,240,976 | B1 | 8/2012 | Kamio | |
| 9,033,668 | B2 | 5/2015 | Bronfeld et al. | |
| 9,353,765 | B2 | 5/2016 | Haley et al. | |
| 9,611,862 | B2 | 4/2017 | Brillet et al. | |
| 2005/0254954 | A1 | 11/2005 | Higashimori et al. | |
| 2013/0129488 | A1* | 5/2013 | Agrawal | F04D 25/082 415/170.1 |
| 2014/0341706 | A1 | 11/2014 | Lardy et al. | |
| 2015/0086396 | A1 | 3/2015 | Nasir | |
| 2016/0053774 | A1 | 2/2016 | Tarnowski et al. | |
| 2016/0281727 | A1 | 9/2016 | Lardy et al. | |
| 2016/0281732 | A1 | 9/2016 | Lardy et al. | |
| 2018/0100517 | A1* | 4/2018 | Sawada | F04D 29/464 |
| 2018/0245598 | A1* | 8/2018 | Meier | F04D 25/06 |
| 2018/0335039 | A1* | 11/2018 | Hayamitsu | F04D 23/008 |
| 2019/0010953 | A1* | 1/2019 | Takao | F04D 17/165 |
| 2019/0154054 | A1* | 5/2019 | Adachi | F04D 25/06 |
| 2020/0006997 | A1* | 1/2020 | Kim | H02K 7/14 |

FOREIGN PATENT DOCUMENTS

| | | | |
|---|---|---|---|
| GB | 604121 | A | 6/1948 |
| GB | 695948 | A | 8/1953 |
| JP | 2001248593 | A | 9/2001 |
| JP | 2003269379 | A | 9/2003 |
| JP | 2009236121 | A | 10/2009 |
| JP | 2014214649 | A | 11/2014 |
| WO | 2011154092 | A1 | 12/2011 |
| WO | 2013141912 | A2 | 9/2013 |
| WO | 2016061446 | A1 | 4/2016 |
| WO | 2016160393 | A1 | 10/2016 |
| WO | 2017125662 | A1 | 7/2017 |

OTHER PUBLICATIONS

Indian Office Action; International Application No. 201914009176; International Filing Date: Mar. 8, 2019; dated Feb. 18, 2020; 8 pages.

Communication pursuant to Article 94(3) EPC; International Application No. 19163280.1-1007; International Filing Date: Mar. 15, 2019; dated May 3, 2021; 27 pages.

Chinese First Office Action; Chinese Application No. 201910202178.7; dated Jan. 10, 2022; 14 pages.

European Office Action; European Application No. 19163280.1; dated Jan. 13, 2022; 6 pages.

* cited by examiner

REFRIGERATION SYSTEM MIXED-FLOW COMPRESSOR

CROSS-REFERENCE TO RELATED APPLICATIONS

This application claims the benefit of U.S. Provisional Application Ser. No. 62/644,017, filed Mar. 16, 2018, which is incorporated herein by reference in its entirety.

BACKGROUND

Embodiments of the disclosure relate generally to a refrigeration system, and more particularly, to a compressor.

Rotary machines are commonly used in refrigeration and turbine applications. An example of a rotary machine includes a centrifugal compressor having an impeller fixed to a rotating shaft. Rotation of the impeller increases a pressure and/or velocity of a fluid or gas moving across the impeller.

In applications using new low-pressure refrigerants, the overall diameter of the compressor is typically large to accommodate the high speeds. However, these large sizes may exceed the available space within a packaging envelope. There is therefore a need to develop a compressor having a reduced footprint and suitable for use in low pressure refrigerant applications.

BRIEF DESCRIPTION

According to an embodiment, an impeller mountable within a centrifugal compressor includes a hub having a front side and a back side, the hub being rotatable about an axis of rotation and a plurality of vanes extending outwardly from the front side of the hub such that a plurality of passages is defined between adjacent vanes. The plurality of vanes is oriented such that a flow output from the plurality of passages adjacent the back side of the impeller is arranged at an angle to the axis of rotation of less than 20 degrees.

In addition to one or more of the features described above, or as an alternative, in further embodiments the angle of the flow output from the plurality of passages is less than 10 degrees.

In addition to one or more of the features described above, or as an alternative, in further embodiments the flow output from the plurality of passages is arranged generally parallel to the axis of rotation.

According to another embodiment, a centrifugal compressor includes a casing, an impeller arranged within the casing being rotatable about an axis, and a diffuser section arranged within the casing. The diffuser section is positioned axially downstream from an outlet of the impeller.

In addition to one or more of the features described above, or as an alternative, in further embodiments the diffuser section further comprises a diffuser structure and an axial flow passage defined between an exterior surface of the diffuser structure and an interior surface of the casing.

In addition to one or more of the features described above, or as an alternative, in further embodiments the diffuser structure is generally cylindrical in shape.

In addition to one or more of the features described above, or as an alternative, in further embodiments the diffuser structure is fixed relative to the axis.

In addition to one or more of the features described above, or as an alternative, in further embodiments comprising a plurality of vanes arranged between the diffuser structure and the casing.

In addition to one or more of the features described above, or as an alternative, in further embodiments the plurality of vanes are arranged at an angle to the axis.

In addition to one or more of the features described above, or as an alternative, in further embodiments the plurality of vanes are arranged to reduce a Mach number of a fluid flow through the compressor by at least 50%.

In addition to one or more of the features described above, or as an alternative, in further embodiments the plurality of vanes includes a plurality of first vanes extending from a first end of the diffuser structure to a central portion of the diffuser structure and a plurality of second vanes extending from the central portion of the diffuser structure to a second end of the diffuser structure.

In addition to one or more of the features described above, or as an alternative, in further embodiments the plurality of first vanes and the plurality of second vanes are substantially identical or different.

In addition to one or more of the features described above, or as an alternative, in further embodiments each of the plurality of second vanes axially overlaps a corresponding vane of the plurality of first vanes.

In addition to one or more of the features described above, or as an alternative, in further embodiments comprising a volute arranged axially downstream from an outlet of the diffuser section.

In addition to one or more of the features described above, or as an alternative, in further embodiments comprising a motor section, wherein an outlet of the diffuser section is arranged in fluid communication with a passageway formed in the motor section.

In addition to one or more of the features described above, or as an alternative, in further embodiments at least one deswirl vane is positioned adjacent the outlet end of the diffuser section.

In addition to one or more of the features described above, or as an alternative, in further embodiments the motor section further comprises a motor housing affixed to the casing, a motor arranged within the motor housing for driving the impeller about the axis, the motor including a stator, and an axial passageway extending between the motor housing and an exterior surface of the stator.

In addition to one or more of the features described above, or as an alternative, in further embodiments the centrifugal compressor is a mixed flow compressor.

In addition to one or more of the features described above, or as an alternative, in further embodiments the centrifugal compressor is operable with a low pressure refrigerant.

In addition to one or more of the features described above, or as an alternative, in further embodiments the centrifugal compressor is operable with a medium pressure refrigerant.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Figure 1:
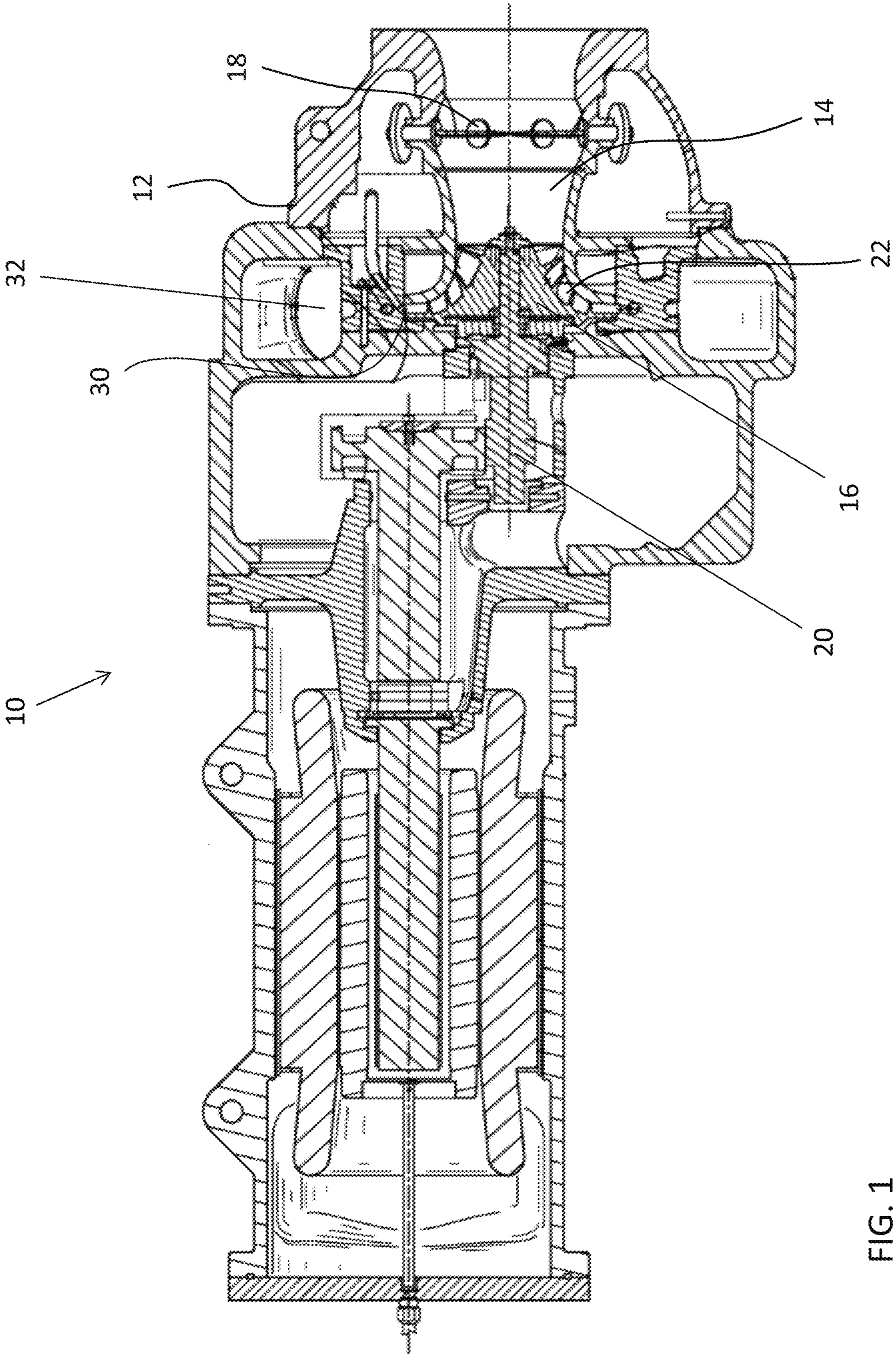
FIG. 1 is a cross-sectional view of a known centrifugal compressor.

Referring now to FIG. 1, an example of an existing centrifugal compressor 10 is illustrated. As shown, the centrifugal compressor 10 includes a main casing 12 having an inlet 14 that directs refrigerant into a rotating impeller 16 through a series of adjustable inlet guide vanes 18. The impeller 16 is secured to a drive shaft 20 by any suitable means to align impeller 16 along the axis of the compressor 10. The impeller 16 has a plurality of passages 22 formed therein that cause the incoming axial flow of a refrigerant fluid to turn in a radial direction and discharge into an adjacent diffuser section 30. The diffuser section 30 is disposed generally circumferentially about the impeller 16 and functions to direct the compressed refrigerant fluid into a toroidal-shaped volute 32, which directs the compressed fluid toward a compressor outlet, or alternatively, toward a second stage of the compressor 10 (not shown), depending on the configuration of the compressor.

Figure 2:
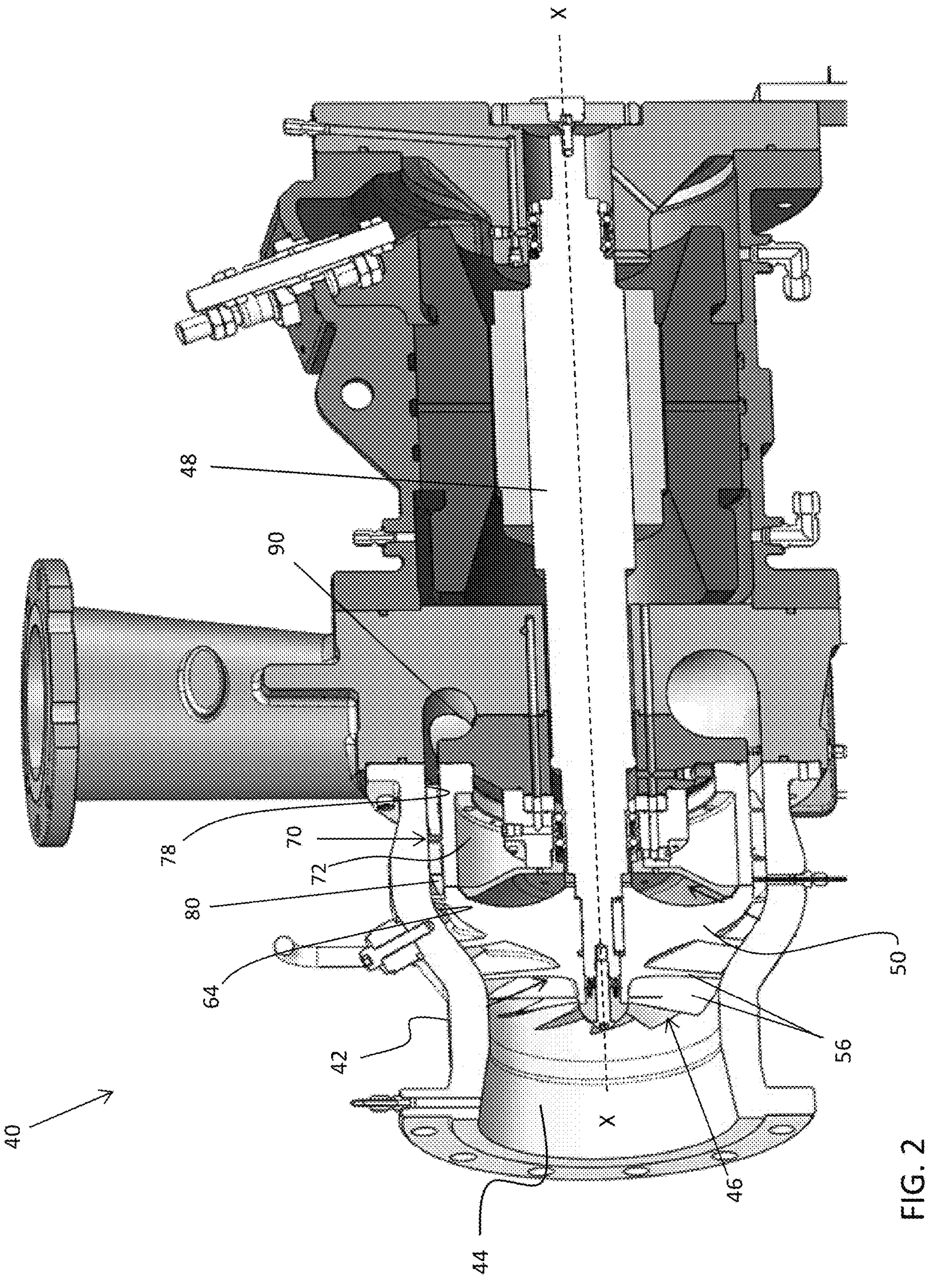
FIG. 2 is a perspective cross-sectional view of a mixed flow centrifugal compressor according to an embodiment.

Because the impeller 16, diffuser 30, and volute 32 are stacked radially about the rotating shaft 20, an overall diameter of the compressor 10 defined by these components may be large, and therefore unsuitable in applications having size restrictions. An example of a centrifugal compressor 40 having a reduced diameter relative to existing centrifugal compressors, such as compressor 10 for example, is illustrated in FIG. 2. In, the illustrated, non-limiting embodiment, the centrifugal compressor 40 is configured as a "mixed flow" compressor. Similar to FIG. 1, the compressor 40 includes a main casing or housing 42 having an inlet 44 through which a fluid, such as refrigerant for example, is directed axially toward a rotating impeller 46. The impeller 46 is secured to a drive shaft 48 such that the impeller 46 is aligned with the axis X of the compressor 40.

Figure 3B:
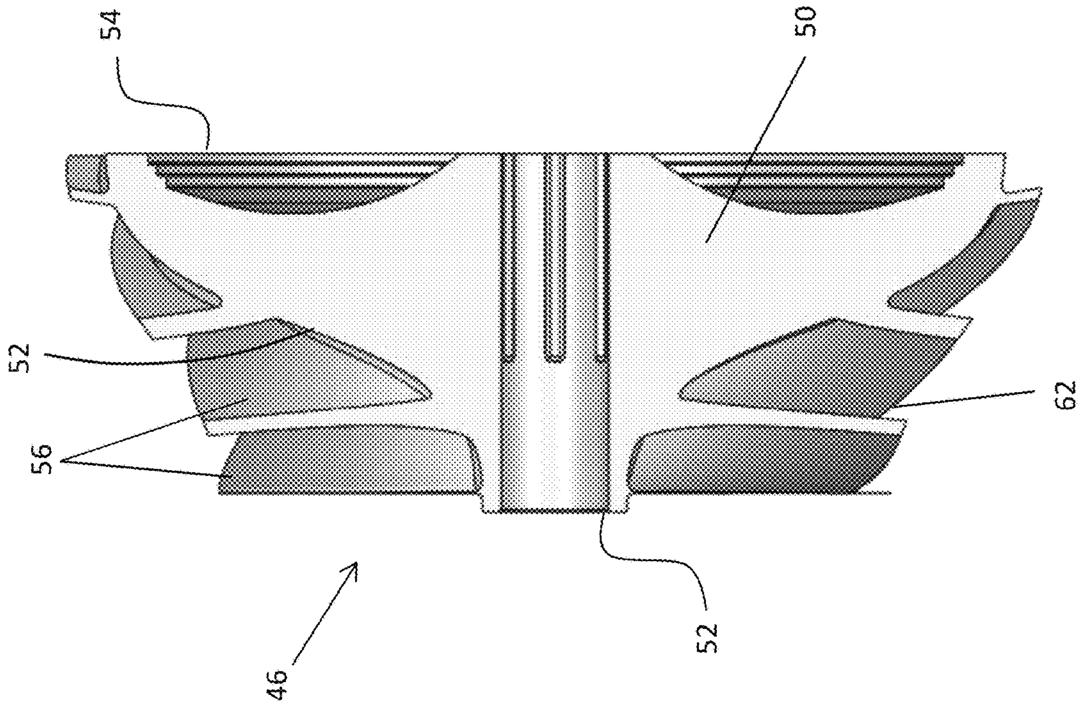
FIG. 3B is a cross-sectional view of an impeller of the mixed flow centrifugal compressor according to an embodiment.
Figure 3A:
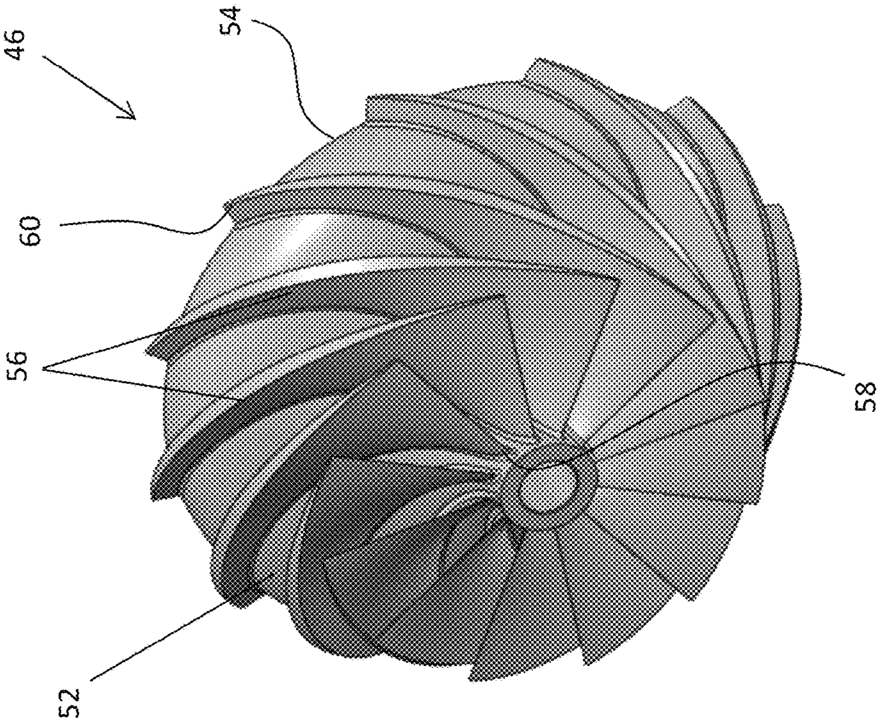
FIG. 3A is front perspective view of an impeller of the mixed flow centrifugal compressor according to an embodiment.

As shown in FIGS. 2, 3A and 3B, the impeller 46 includes a hub or body 50 having a front side 52 and a back side 54. As shown, the diameter of the front side 52 of the body 50 generally increases toward the back side 54 such that the impeller 46 is generally conical in shape. A plurality of blades or vanes 56 extends outwardly from the body 50. Each of the plurality of blades 56 is arranged at an angle to the axis of rotation X of the shaft 48 and the impeller 46. In an embodiment, each of the blades 56 extends between the front side 52 and the back side 54 of the impeller 46. As shown, each blade 56 includes a first end 58 arranged generally adjacent a first end of the hub 50 and a second end 60 located generally adjacent the back side 54 of the impeller 46. Further, the second end 60 of the blade 56 is circumferentially offset from the corresponding first end 58 of the blade 56.

A plurality of passages 62 is defined between adjacent blades 56 to discharge a fluid passing over the impeller 46 generally parallel to the axis X. As the impeller 46 rotates, fluid approaches the front side 52 of the impeller 46 in a substantially axial direction and flows through the passages 62 defined between adjacent blades 56. Because the passages 62 have both an axial and radial component, the axial flow provided to the front surface 52 of the impeller 46 simultaneously moves both parallel to and circumferentially about the axis of the shaft 48. In combination, the inner surface 64 (shown in FIG. 1) of the housing 42 and the passages 62 of the impeller 46 cooperate to discharge the compressed refrigerant fluid from the impeller 46. In an embodiment, the compressed fluid is discharged from the impeller 46 at any angle relative to the axis X of the shaft 48 into an adjacent diffuser section 70. The angle may between 0°, generally parallel to the axis of rotation X of the shaft 48, and less than 90°, less than '75°, less than 60', less than 45°, less than 30°, less than 20°, less than 10', or less than 5° for example.

Figure 4:
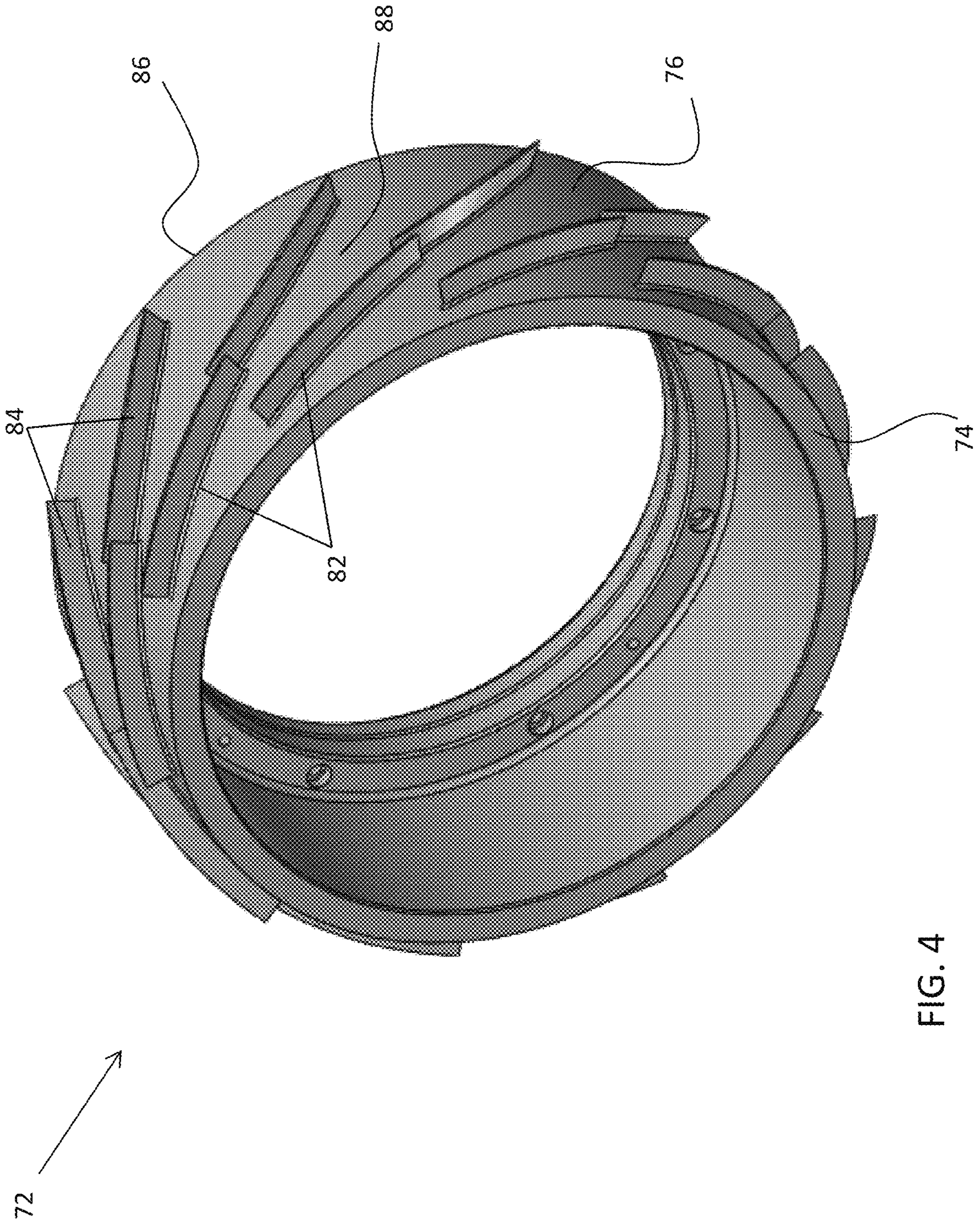
FIG. 4 is a perspective view of a diffuser structure of the mixed flow centrifugal compressor according to an embodiment.

The diffuser section 70 includes a diffuser structure 72 (shown in FIGS. 1 and 4) mounted generally circumferentially about the shaft 48, at a location downstream from the impeller 46 relative to the direction of flow through the compressor 40. In the illustrated, non-limiting embodiment, the diffuser structure 72 is tubular in shape. When the diffuser structure 72 is mounted within the compressor 40, a first end 74 of the diffuser structure 7:2 may directly abut the back side 54 of the impeller 46. Further, the diffuser structure 72 may be mounted such that an outer surface 76 thereof is substantially flush with the front surface 52 of the impeller 46 at the interface with the back surface 54. In this configuration, the fluid flow through the compressor 40 smoothly transitions from the impeller 46 to the diffuser section 70. Although the mixed-flow impeller illustrated and described herein is unshrouded, embodiments where a shroud is disposed circumferentially about the impeller 46 are also within the scope of the disclosure.

In the illustrated, non-limiting embodiment, the outer surface 76 of the diffuser structure 72 is oriented generally parallel to the axis of rotation X of the shaft 48 and the impeller 46. However, an outer surface 76 having another configuration is also contemplated herein. In addition, the interior surface 78 of the portion of the casing 42 within the diffuser section 70 may be oriented generally parallel to the outer surface 76 of the diffuser structure 72. In such embodiments, an axial flow channel 80 configured to receive the fluid discharged from the impeller 46 is defined between the outer surface 76 and the casing 42.

The diffuser structure 72 may include a plurality of circumferentially spaced vanes affixed about the outer surface 76. In the illustrated, non-limiting embodiment, the diffuser structure 72 includes a plurality of first vanes 8:2 extending from adjacent a first, upstream end 74 of the diffuser structure 72 to a central portion of the diffuser structure 72, and a plurality of second vanes 84 extending from a central portion of the diffuser structure 72 to generally adjacent a downstream end 86 of the diffuser structure 7:2. The plurality of first vanes 82 may be substantially identical and/or the plurality of second vanes 84 may be substantially identical. Alternatively, the first vanes 82 and/or second vanes 84 may vary in size and/or shape. In addition, the total number of first vanes may be equal to or different that the total number of second vanes. Although the diffuser structure 72 is illustrated and described as having a plurality of first vanes 82 and a plurality of second vanes 84, it should be understood that embodiments having only a single group of vanes, or alternatively, embodiments having more than two groups of vanes are also considered within the scope of the disclosure.

As shown, both the plurality of first vanes 82 and the plurality of second vanes 84 are oriented at an angle to the axis of rotation X of the shaft 48. The angle of the plurality of first vanes 82 relative to the axis X may be the same, or alternatively, may be different than the angle of the plurality of second vanes 84 relative to the axis X. Each of the plurality of second vanes 84 may be aligned with a corresponding vane of the plurality of first vanes 82. Alternatively, the plurality of second vanes 84 may be circumferentially offset from the plurality of first vanes 82. In embodiments including this circumferential offset between the plurality of first vanes 82 and the plurality of second vanes 84, adjacent ends of a corresponding first and second vane 82, 84 may, but need not overlap one another about the axial length of the diffuser structure 72, as shown.

As the refrigerant passes through the passageways 88 defined between adjacent vanes 82, 84 of the diffuser structure 72, the kinetic energy of the refrigerant may be converted to a potential energy or static pressure. In an embodiment, the configuration of the plurality of vanes 82, 84 is selected to reduce a Mach number of the fluid flow, by at least 25%, and in some embodiments, by up to 50% or more. In an embodiment, inclusion of the vanes 82, 84 reduces the Mach number of the flow from above 1 to between about 0.3 and 0.4. Further, it should be understood that the diffuser structure 72 illustrated and described herein is intended as an example only and that other diffuser structures having an axial flow configuration and arranged in fluid communication with the passages 62 of the impeller 46 are also contemplated herein.

Similar to existing compressors, the diffuser section 70 may function to direct the compressed refrigerant fluid into an adjacent toroidal volute 90, as shown in FIG. 2, which directs the compressed fluid toward a compressor outlet. Because the flow through the diffuser structure 72 is axial, the volute 90 for receiving the flow from the diffuser structure 72 is arranged axially downstream from the second end 86 of the diffuser structure 72. Within the volute 90, the fluid may be directed radially toward an outlet.

Figure 5:
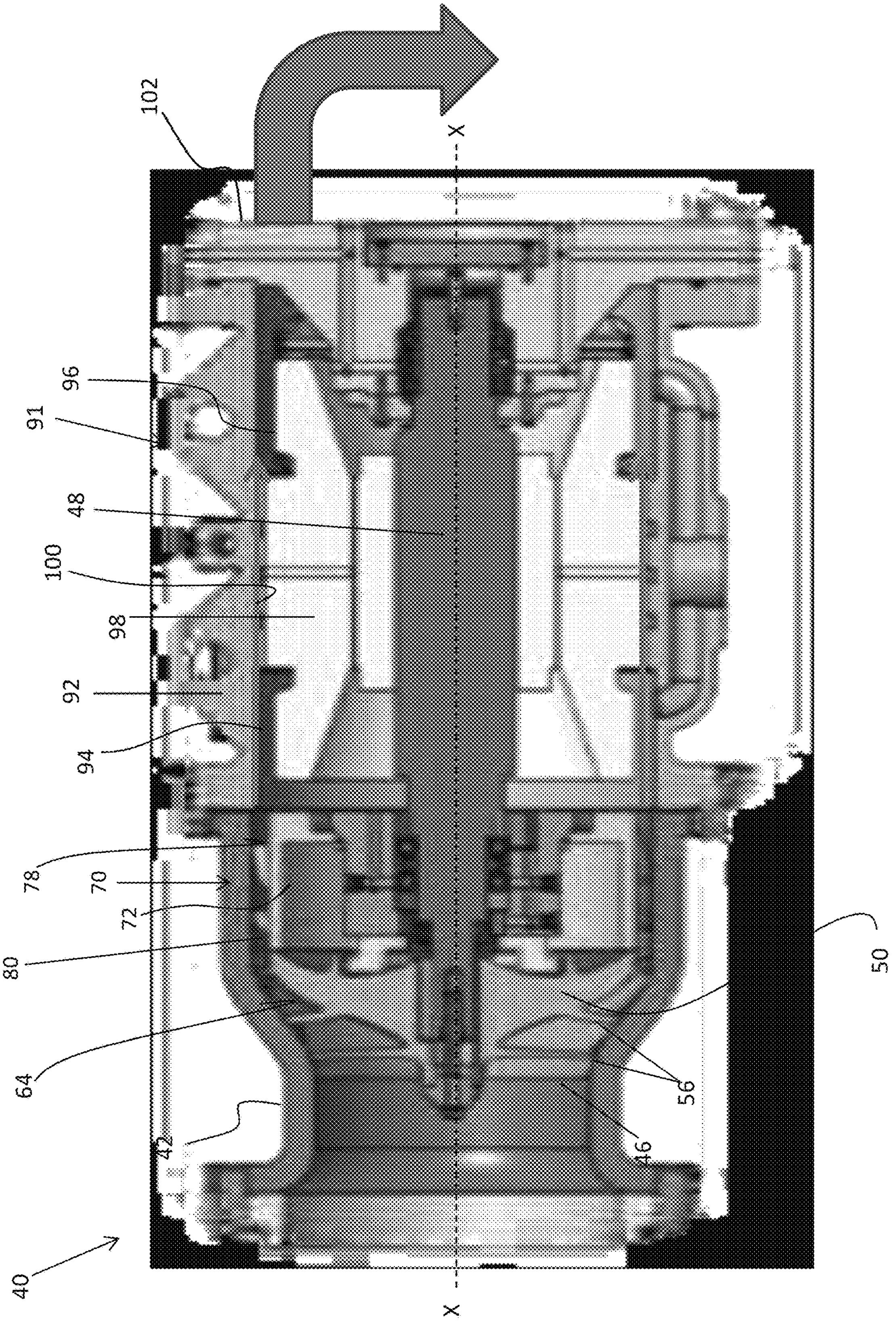
FIG. 5 is a cross-sectional view of a mixed flow centrifugal compressor according to another embodiment.

In another embodiment, best shown n FIG. 5, the diffuser structure 72 may direct the compressed fluid flow toward a motor section 91 of the compressor including an adjacent motor housing 92. As shown, a passageway 94 may be defined between an exterior surface 96 of a motor stator 98 and an interior surface 100 of the motor housing 92. The passageway 94 has a generally axial configuration and is generally aligned with the flow channel 80 defined between the diffuser structure 72 and the casing 42. In addition, one or more deswirl vanes (not shown) may be located at the interface between the flow channel 80 and the passageway 94 to limit the rotation of the fluid flow about the axis X. From the passageway 94, the fluid flow is provided to an outlet 102, such as formed in an end of the compressor 40 for example.

A compressor 40 having a mixed flow configuration as illustrated and described herein is suitable for use with any type of refrigerant, and may be particularly useful with low or medium pressure refrigerants. Low pressure refrigerants typically have evaporator pressure lower than atmospheric pressure and medium pressure refrigerants typically have evaporator pressure above atmospheric pressure. The mixed flow compressor 40 may provide a substantial size reduction over existing centrifugal compressors. In addition, because a high pressure ratio is achieved in the single stage described, the compressor 40 may be simplified by eliminating the need for subsequent stages. As a result, the radius of the compressor 40 may be reduced up to about 40% and a length of the compressor 40 may be reduced by more than 10%. Further, the performance of the compressor 40 is improved compared to conventional centrifugal compressors.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A centrifugal compressor comprising:

a casing;

an impeller arranged within the casing, the impeller being rotatable about an axis;

a diffuser section arranged within the casing, the diffuser section being positioned adjacent to the impeller and axially downstream from an outlet of the impeller; and a motor section including a motor for driving the impeller about the axis and a passageway, the motor having a stator and a rotor, the motor being arranged axially downstream from an outlet of the diffuser section, the outlet of the diffuser section being arranged in fluid communication with the passageway;

wherein the diffuser section further comprises:

a diffuser structure having a plurality of vanes formed about an exterior surface thereof, the plurality of vanes being arranged at an angle to the axis; and an axial flow passage defined between an exterior surface of the diffuser structure and an interior surface of the casing; and a deswirl vane positioned axially downstream from the outlet end of the diffuser section, the deswirl vane being arranged at the interface between the axial flow passage and the passageway to limit rotation of the fluid flow about the axis.

2. The centrifugal compressor of claim 1, wherein the diffuser structure is generally cylindrical in shape.

3. The centrifugal compressor of claim 1, wherein the diffuser structure is fixed relative to the axis.

4. The centrifugal compressor of claim 1, further comprising a plurality of deswirl vanes arranged between the diffuser structure and the casing.

5. The centrifugal compressor of claim 4, wherein the plurality of deswirl vanes are arranged at an angle to the axis.

6. The centrifugal compressor of claim 1, wherein the plurality of vanes includes a plurality of first vanes extending from a first end of the diffuser structure to a central portion of the diffuser structure and a plurality of second vanes extending from the central portion of the diffuser structure to a second end of the diffuser structure.

7. The centrifugal compressor of claim 6, wherein the plurality of first vanes and the plurality of second vanes are substantially identical or different.

8. The centrifugal compressor of claim 6, wherein each of the plurality of second vanes axially overlaps a corresponding vane of the plurality of first vanes.

9. The centrifugal compressor of claim 1, wherein the motor section further comprises:

a motor housing affixed to the casing, the motor being arranged within the motor housing and the passageway having an axial configuration that extends between the motor housing and an exterior surface of the stator.

10. The centrifugal compressor of claim 1, wherein the centrifugal compressor is a mixed flow compressor.

11. The centrifugal compressor of claim 1, wherein the centrifugal compressor is operable with a low pressure refrigerant.

12. The centrifugal compressor of claim 1, wherein the centrifugal compressor is operable with a medium pressure refrigerant.

* * * * *